2,999,023
CONFECTIONARY COATING COMPOSITIONS

Vigen K. Babayan, Livingston, and George Newell Comes, Denville, N.J., assignors to E. F. Drew & Co., Inc., New York, N.Y., a corporation of Delaware
No Drawing. Filed May 8, 1959, Ser. No. 811,816
6 Claims. (Cl. 99—118)

The present invention is directed to compositions of edible nature and more particularly to additives to confectionary coatings whereby their properties are improved.

Chocolate and other confectionary coatings made from hard butters have suffered from the blooming, greying and dulling effect of the candy surface. A variety of reasons and explanations have been advanced to explain the loss of gloss. Particularly in confectionary coatings, a number of additives have been used to eliminate or minimize the loss of gloss on storage. Among the types of additives suggested have been mono- and di-glycerides of fatty acids, sorbitol esters, ethoxylated polyol esters, phosphates and lecithin. To some extent improvements have been noted by the use of one or more of these additives in the preparation of confectionary coatings. There remains a good deal of room however, for a satisfactory coating able to withstand all conditions encountered in the trade, such as storage, high temperatures, and low temperatures. There has always been one or more factors which nullified any advantages the product may have been able to impart. Glucoside esters, for example, have been shown to impart gloss to confectionary coatings but their color, flavor and odor have not been completely satisfactory. The difficulty of producing a pure enough glucoside ester for this use has been thus far uneconomical.

Some attempts have been made to use sugar esters in confectionary coatings but such coatings even when they imparted some gloss improvement did not possess the flavor, taste, odor and palatability of the present invention. Such products after initial gloss, lost their desired characteristics and their adverse taste and flavor became pronounced making such products totally unacceptable for public use.

For example, when sucrose mono-stearates or di-stearates were tested in hard butters it was found that they not only had poor compatability with the various types of hard butters, but they gave flavors which were very objectionable. The confectionary coatings made from them did have good initial gloss but that gloss was lost in a relatively short time of testing.

It is among the objects of the present invention to overcome the disadvantages of prior compositions of the type described and to provide confectionary coatings which are stable and have a high gloss and which do not lose their gloss with lapse of time.

It is also among the objects of the invention to introduce an additive to such compositions which will impart desirable flavor, taste, odor and palatability to the coatings.

In practicing the invention there is provided a hard butter which is usually the triglyceride mixed esters principally of higher fatty acids having 12 to 18 carbon atoms. To such hard butter there is added a minor proportion of the higher fatty acid esters of sucrose, which esters are substantially pure and free from soaps or other contaminants. Such purity has been found essential in the invention. These esters are of fatty acids having 10 to 24 carbon atoms and mixtures thereof. There may be present from 1 to 8 such fatty acid radicals in each molecule, and the amount of said additives used in the compositions varies from .5% to 10%.

For hard butters made by the esterification of specific fatty acids with glycerine (reconstituted esters) the sucrose tri-stearate and hexa-stearate give the most satisfactory gloss (initial and permanent). Although the other esters all do contribute gloss and are an improvement over a blank experiment having no sucrose ester additive, nevertheless the performance of the two types noted are distinctly better than the rest. For hard butters made by the disproportionation of fatty oils, the sucrose mono- and di-palmitate appeared to give the best gloss results; again, the other esters appear to give better results than the corresponding blank but the two esters mentioned were superior. For hard butters made by the rearrangement of a coconut type fat with a vegetable oil having essentially $C_{16}$ and $C_{18}$ fatty acids, the sucrose di-, tri- and tetra-esters of stearic acid proved to be outstanding. For hard butters of mixed types combining a variety of raw materials in its composition specific advantages were noted in sucrose esters of di- to octa-stearates. For hard butters compatible with cocoa butter and chocolate liquor, the sucrose tri-stearate was very distinctly superior to the other sucrose esters tried.

In the above experiments percentages from 1% to 10% of the esters were tried. The most significant results were found above 1% and below 5%. If one is satisfied with less significant improvement, however, even percentages of 0.5% gave visible improvement over the blank. In products which it is desired to disperse in water or emulsify readily, the incorporation of the high percentages of sugar esters was found to be advantageous.

The broad class of sugar esters is available from $C_{10}$ to $C_{24}$ fatty acids, saturated and unsaturated, esters from mono- to the octa-ester. Each ester has rather specific characteristics and can function best in a formulation best suited for those specific characteristics. Thus the mono- and di-palmitic esters of sucrose are outstanding in imparting gloss to the hard butters having a high softening point, whereas the tri-stearate esters of sugars are specific for the cocoa butter compatible hard butters. The hexa- and octa-stearate esters of sugars are most useful for the rearranged, mixed types. The utility and advantages shown by the sugar esters are not limited to the hard butters and confectionary coatings. It has been found that the sugar esters can advantageously be added to cocoa butter, chocolate liquor and chocolate per se to obtain better and more permanent gloss, smoother blending and retarding of bloom.

The sugar esters of $C_{14}$ to $C_{24}$ saturated fatty acids are solids and can be added either to the melted hard butter or cocoa butter and mixed. The sugar esters of $C_{12}$ and below and the unsaturated fatty acid esters are liquid; they can be mixed even in the cold by kneading or churning. From the standpoint of stability, color, odor, etc. the sugar esters of the saturated fatty acids from $C_{14}$ to $C_{24}$ are to be preferred.

In processes previously used for making sugar esters, the final product contained a substantial amount of soaps, even after the usual purification operations. Such esters have been found to be inadequate for the present purposes. Therefore they must be further purified for the elimination of the soaps and this may be accomplished by repeated crystallizations from a mixture of acetone and ethyl alcohol, for example.

A confectionary coating usually contains about 25% to 40% of hard butter, the remainder being a mixture of sugar, milk solids, flavoring and other constituents. The additive is ordinarily introduced into the hard butter before compounding with the other ingredients.

The following is a specific example of a coating composition made in accordance with the present invention:

200 parts by weight of 197.5 parts of hard butter and 2.5 parts of a purified sugar ester are mixed with 400 parts by weight of a mixture of sugar, cocoa and flavoring. 1.25 parts by weight of lecithin are introduced and mixed for two hours at 140° F. in a Hobart mixer. The batch is then transferred to a stainless steel mixing bowl. The material is tempered by alternately dipping the bowl in cool water and recovering, while the mix is being stirred constantly. When the coating has become quite heavy, cooling is discontinued, and the bowl is dipped in warm water while stirring, until the coating is thin enough to be used. The coating is used to then enrobe eight marshmallows, and eight molded bars are cast. The coated and cast pieces are then stored three days before being evaluated.

The evaluations are conducted as follows:

(1) The pieces are observed and the gloss recorded under "room temperature storage."

(2) Two of the enrobed and two of the cast pieces are placed on foil, and alternately placed in a 90° F. oven for 45 minutes, and at room temperature a minimum of 2 hours. This procedure is repeated for a total of six cycles. The gloss is recorded after pieces have reached room temperture under "heat test."

(3) Two of the enrobed and two of the cast pieces are placed on foil, and alternately placed in a 90° F. oven for 45 minutes, then in a 32° F. refrigerator one hour, then at room temperature for a minimum of two hours. The gloss is recorded after pieces have reached room temperature. This procedure is repeated for a total of six cycles, and results recorded under "heat-cool test." The gloss as recorded in the above tests is listed "Ex" for excellent, "G" for good, "F" for fair, and "P" for poor. Poor is the point at which the piece has lost all gloss, or is badly bloomed.

The following table shows typical results obtained by the above tests using various hard butters.

| Type of Sugar Ester | Percent in Hard Butter | Gloss | | |
|---|---|---|---|---|
| | | Initial | After 6th Heat | After 6th Heat and Cooling |
| Mono-stearate | 2 | Ex/Ex | Ex/F+ | G−/G−. |
| Di-stearate | 2 | Ex/G | Ex/F+ | Ex/G. |
| Do | 5 | Ex/Ex | Ex/G | Ex/G. |
| Tri-stearate | 1 | Ex/G+ | G+/F | G+/F+. |
| Do | 2 | Ex+/Ex+ | Ex+/Ex+ | Ex/Ex. |
| Tetra-stearate | 2 | Ex/G | Ex/G+ | Ex/G+. |
| Hexa-stearate | 2 | Ex/Ex | Ex/Ex | G+/G+. |
| Octa-stearate | 1 | Ex/Ex | Ex/G+ | Ex/G. |
| Do | 2 | Ex/Ex | Ex/G+ | Ex/G+. |
| Di-Palmitate | 2 | Ex/Ex | Ex/Ex | Ex/Ex. |
| Do | 4 | Ex/Ex | Ex/Ex | Ex/Ex. |
| Tetra-Palmitate | 1 | Ex/Ex | Ex/Ex | Ex/G+. |
| Hexa-Palmitate | 1 | G+/Ex | Ex/Ex | G+/G+. |
| Octa-Palmitate | 2 | Ex/Ex | Ex/Ex | G+/G+. |
| Control Experiment | 0 | Ex/Ex | G/F | F/F. |

In cocoa butter products, sucrose diesters show up well and improve the gloss of chocolate. The diester of sucrose with stearin is particularly effective for this purpose.

For cream fillings and dispersable chocolate coating products, 5% and even 10% of the sugar esters were added to hard butters and they were then formulated with sugar, cocoa, flavorings etc. The use of higher percentages is very advantageous where a gas such as air or nitrogen, water or other ingredients are to be incorporated and entrained in the plastic fat.

What is claimed is:

1. In a confectionary coating containing a hard fat, the improvement which comprises the presence in said fat in dispersion of sucrose esters substantially pure and free from soap, said esters being of fatty acids having 10 to 24 carbon atoms, there being present from 1 to 8 esterifying acid radicals in said esters, said coating being intimately mixed with a substance taken from the class consisting of cocoa, cocoa butter, and flavoring.

2. In a confectionary coating containing a hard fat, the improvement which comprises the presence in said fat in dispersion of sucrose esters substantially pure and free from soap, said esters being of fatty acids having 10 to 24 carbon atoms, there being present from 1 to 8 esterifying acid radicals in said esters, the amount of ester present being about .5 to 10% based on said hard fat, said coating being intimately mixed with a substance taken from the class consisting of cocoa, cocoa butter, and flavoring.

3. In a confectionary coating containing a hard fat, the improvement which comprises the presence in said fat in dispersion of sucrose esters substantially pure and free from soap, said esters being of fatty acids having 10 to 24 carbon atoms, there being present from 1 to 8 esterifying acid radicals in said esters, the amount of ester present being about 1–5% based on said hard fat, said coating being intimately mixed with a substance taken from the class consisting of cocoa, cocoa butter, and flavoring.

4. In a confectionary coating containing a hard fat, the improvement which comprises the presence in said fat in dispersion of sucrose esters substantially pure and free from soap, said esters being of fatty acids having 16 to 18 carbon atoms, there being present from 1 to 8 esterifying acid radicals in said esters, said coating being intimately mixed with a substance taken from the class consisting of cocoa, cocoa butter, and flavoring.

5. A hard butter comprising a hard fat and a sucrose ester substantially pure and free from soap, said ester being of fatty acids having 10 to 24 carbon atoms, there being present from 1 to 8 esterifying acid radicals said hard butter being intimately mixed with a substance taken from the class consisting of cocoa, cocoa butter, and flavoring.

6. A hard butter comprising a hard fat and a sucrose ester substantially pure and free from soap, said ester being of fatty acids having 10 to 24 carbon atoms, there being present from 1 to 8 esterifying acid radicals, the amount of ester present being about .5 to 10% based on said hard fat, said hard butter being intimately mixed with a substance taken from the class consisting of cocoa, cocoa butter, and flavoring.

References Cited in the file of this patent
UNITED STATES PATENTS

| | | |
|---|---|---|
| 2,024,356 | Harris | Dec. 17, 1935 |
| 2,671,027 | Cross | Mar. 2, 1954 |
| 2,831,854 | Tucker | Apr. 22, 1958 |
| 2,893,990 | Hass et al. | July 7, 1959 |

OTHER REFERENCES

Jensen: Chemistry Flavoring and Manufacturing of Chocolate Confectionery and Cocoa, published by J and A Churchill, London, 1931, pp. 150 and 151.